United States Patent [19]

Bopp

[11] 4,351,425

[45] Sep. 28, 1982

[54] DUAL STAGE CONTROL FOR VISCOUS FLUID COUPLING

[75] Inventor: Warren G. Bopp, Farmington Hills, Mich.

[73] Assignee: Eaton Corporation, Cleveland, Ohio

[21] Appl. No.: 220,928

[22] Filed: Dec. 29, 1980

[51] Int. Cl.³ ................ F16D 35/00; F16D 43/25
[52] U.S. Cl. ........................ 192/58 B; 123/41.12; 192/82 T
[58] Field of Search .............. 192/58 B, 82 T; 123/41.12

[56] References Cited

U.S. PATENT DOCUMENTS

| | | | |
|---|---|---|---|
| 2,658,400 | 11/1953 | Dodge | 74/230.17 |
| 2,974,768 | 3/1961 | Hause | 192/82 T |
| 3,559,786 | 2/1971 | Long, Jr. | 192/58 B |
| 3,968,866 | 7/1976 | Leichliter et al. | 192/58 B |
| 3,972,399 | 8/1976 | Bopp | 192/58 B |
| 4,056,178 | 11/1977 | Detty | 192/58 B |
| 4,064,980 | 12/1977 | Tinholt | 192/58 B |

Primary Examiner—Allan D. Herrmann
Attorney, Agent, or Firm—C. H. Grace; F. M. Sajovec

[57] ABSTRACT

A viscous fan clutch (10) is typically employed in a fan drive mechanism within a truck or automobile. A shaft (12) driven by the engine, rotates a clutch member (24) within the fan drive. The clutch member is arranged for fluid engagement with a cover assembly (38) for the transmission of torque thereto when the fluid is disposed in an operating chamber (70) defined by complementary shear surfaces (30, 31, 56, and 57) in the clutch and cover. During relative rotation between the clutch and cover, fluid is pumped from the operating chamber to primary (76) and secondary (77) fluid storage chambers. Independent fluid temperature responsive control valves (120 and 190) provide for selective communication between the storage chambers and the operating chamber to effect modulation of the total fluid flow whereby dual speed operation of the clutch is achieved. In the preferred embodiment, one of the valves operates in response to impinging ambient air at a relatively low temperature and the other valve operates in response to sensed engine coolant temperature at a relatively high temperature.

15 Claims, 3 Drawing Figures

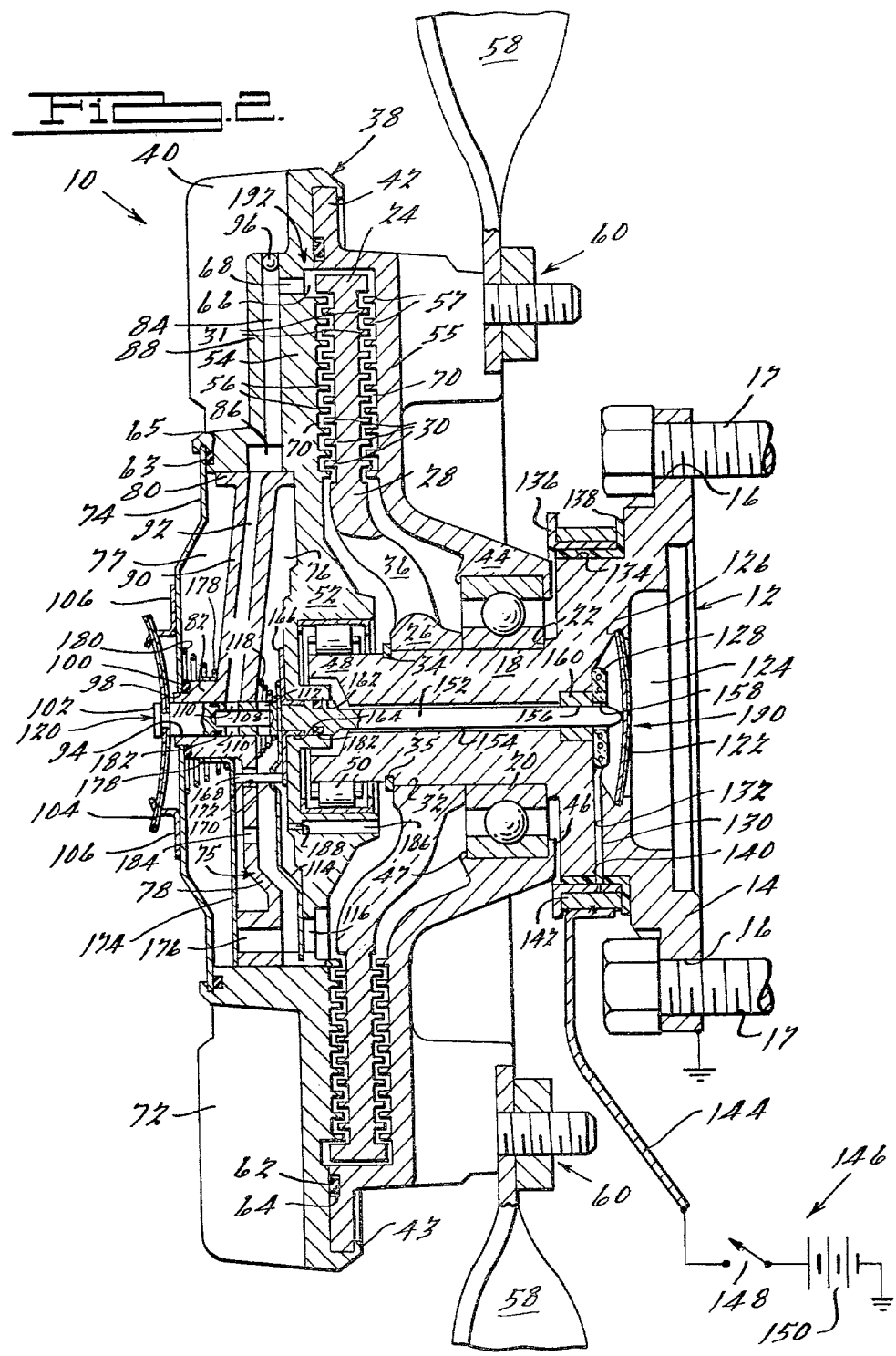

DUAL STAGE CONTROL FOR VISCOUS FLUID COUPLING

INTRODUCTION

The present invention relates to viscous fluid couplings, and more particularly to such couplings which transmit torque as a function of the temperature of an associated fluid. More particularly still, the present invention relates multispeed viscous fluid couplings which are employed as vehicle fan drives and which are actuated as a function of fluid temperature.

CROSS-REFERENCES

The subject matter of this invention is related to that of copending United States Application Serial No. 220,929, filed Dec. 29, 1980.

BACKGROUND OF THE INVENTION

Viscous fluid couplings have received wide acceptance in the automotive industry for controlling the amount of torque trasmitted to a radiator cooling fan. The most common form of such viscous fluid couplings is the air temperature response type such as illustrated in U.S. Pat. No. 3,055,473. In certain applications, however, it has become desirable to directly sense the engine cooling water temperature rather than temperature of the air passing through the radiator. To date, many arrangements have been proposed to accomplish this result. Typically, these arrangements have made use of wet or dry plate clutches that are electrically actuated. In both of these arrangements, the advantages achieved through the use of viscous fluid have not been applied.

The need for a fan drive having more than one speed ratio is evidenced by U.S. Pat. No. 3,444,748, which illustrates a fan drive including a fluid coupling providing a high speed ratio (i.e. ratio of output or fan speed to input or engine speed) at low engine speeds when relatively little air is being forced through the radiator due to movement of the vehicle, and an overrunning clutch for providing lower ratios at high engine speeds so that less horsepower is being wasted driving the fan when higher vehicle speed is forcing a greater amount of air through the radiator. Reducing the speed ratio of the fan drive at higher engine speeds is also desirable to reduce the heat built up within the fan drive. However, such fan drives often include no provision for disengagement when the air temperature within the engine compartment is such that operation of the fan is unnecessary. Furthermore, such fan drives cannot be modified in an obvious manner to provide for purely temperature-responsive multispeed operation when a higher speed ratio at higher temperatures is required.

Although temperature responsive multispeed viscous couplings have been proposed in the prior art, they have generally not been widely commercially successful due to their complexity, size and cost. One approach to dual speed operation has been to provide dual input members with associated mechanical drive mechanisms which are selectively engaged to drive the input shaft of the coupling at different speeds. Another prior art approach to multispeed operation has been through the restriction of fluid flow through a relatively large drain port by an overlaying valving element which is repositioned to provide, in effect, a variable orifice. Such approaches, although gaining some commercial acceptance, have proven to provide poor repeatability by being unable to precisely control the amount of viscous fluid in the operating chamber of the fluid coupling. Additionaly, such devices typically repositioned their valve by the use of a single temperature sensing element which, although operating well about a single calibration point, was unable to provide reliable operation at two or more varying temperature set points or over a wide range of operation.

It will be apparent from a reading of the specification that the present invention may be advantageously utilized with fluid couplings intended for many different applications. However, the invention is especially useful when applied to a viscous coupling or clutch which serves as a drive for a radiator cooling fan of a vehicle engine, and will be described in connection therewith.

BRIEF DESCRIPTION OF THE INVENTION

The present invention finds particular application in a viscous fluid clutch of the type including first and second members mounted for relative rotation about a common axis and defining cooperating shear surfaces which operate to transmit torque when a flow of viscous fluid is established therebetween. According to the invention, and by way of overcoming the above described shortcomings of prior art viscous fluid clutches, the viscous fluid clutch is provided with the ability to modulate the flow of viscous fluid as a function of a first sensed fluid (ambient air, engine coolant, etc.) temperature and separate means to further modulate the flow of viscous fluid as a function of a second sensed fluid temperature. This arrangement permits temperature-responsive multispeed operation of a viscous fluid clutch which is highly reliable, repeatable, mechanically simple and inexpensive.

The preferred embodiment of the invention finds particular application in a motor vehicle viscous fluid clutch of the type including a first clutch member fixed on a shaft for rotation therewith and a second clutch member supported by the shaft for rotation thereabout and having shear surfaces which coact with complimentary shear surfaces on the first member to define an operating chamber therebetween. First and second fluid storage chambers are located near the operating chamber and a pump provides a circulating flow of viscous fluid between the chambers. According to the preferred embodiment of the invention, a first valve operates to modulate flow of viscous fluid between the first storage chamber and the operating chamber as a function of a first sensed fluid temperature and a second valve operates to modulate flow of viscous fluid between the second storage chamber and the operating chamber as a function of a second sensed fluid temperature. This arrangement has the advantage of providing dual temperature responsive valves which can be calibrated at widely varying temperatures (of the same fluid) and/or monitor the temperature of distinctly separate fluids (e.g. ambient air temperature and liquid coolant temperature of the engine associated with the viscous clutch).

According to another aspect of the invention the first and second fluid storage chambers are serially interconnected with the operating chamber whereby the fist valve also operates to modulate the flow of viscous fluid from the second storage chamber to the operating chamber. This arrangement provides the advantage of simple clutch structure.

According to another aspect of the invention, a fluid return passageway empties into the first fluid storage chamber which, in turn, spills over into the second storage chamber. This arrangement has the advantage of assuring a preestablished measure of viscous fluid is contained within the first storage chamber immediately prior to opening of the first valve.

According to still another aspect of the invention, one of the means for modulating the flow of viscous fluid includes a heating element, a control circuit operative to energize the heating element in response to the coolant temperature exceeding a predetermined value, a secondary control pin and a bimetallic element operative to displace the pin in response to receiving heat from the element. This arrangement has the advantage of permitting the incorporation of the modulation means in a protected environment within the clutch to assure durability and integrity of operation.

According to still another aspect of the invention, one of the means to modulate fluid flow includes a valve actuable in response to the impingement of ambient air upon a bimetallic element operably engaging a pump valve disposed substantially coaxially with the clutch input shaft.

Various other features and advantages of this invention will become apparent upon reading the following specification, which, along with the patent drawings, describes and discloses a preferred embodiment of the invention in detail.

The detailed description of the disclosed embodiment makes reference to the accompanying drawings.

BRIEF DESCRIPTION OF THE DRAWINGS

FIG. 2, is a cross-sectional view on an enlarged scale taken on line 2—2 of FIG. 1.

DETAILED DESCRIPTION OF THE PREFERRED EMBODIMENT

Figure 1:
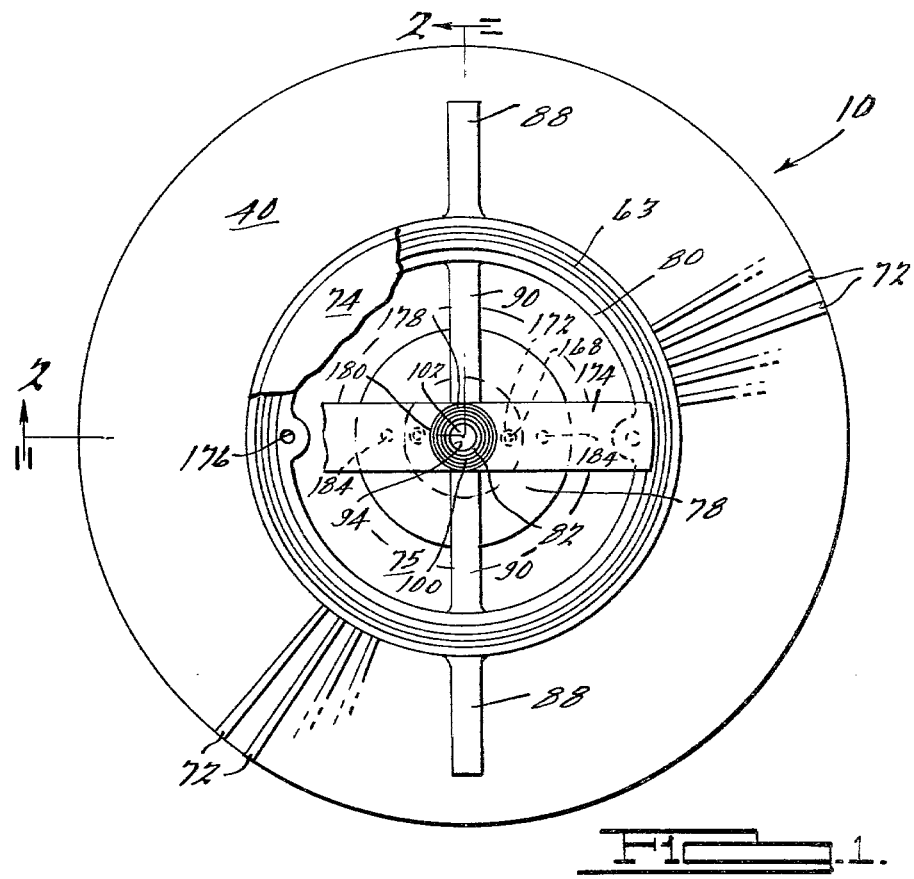
FIG. 1, is front plan view of the preferred embodiment of the invention with the front cover plate broken away.

Referring to FIGS. 1 and 2, the preferred embodiment of a viscous fluid clutch 10 is illustrated. Clutch 10 comprises a driving or input shaft 12 including an integral shaft flange 14. Flange 14 defines a number of circumferentially spaced apertures 16 which accommodate bolts 17 for mounting clutch 10 to a driven shaft (not shown) such as that of an automobile engine coolant pump which is driven by a pulley and V-belt as is well known in the art. Driving shaft 12 is provided with a reduced intermediate portion 18 which functions as an in er race supporting surface for a ball bearing assembly 20. A shoulder 22 formed on shaft 12 restrains bearing 20 in one axial direction.

A clutch member 24 is provided with a hub portion 26 and a plate portion 28 having a plurality of concentric and annular coupling lands 30 formed on the front side thereof. Another plurality of concentric annular coupling lands 31 are formed on the back side of plate portion 28 of clutch member 24. Hub portion 26 is provided with a straight wall opening 32 which has an interference fit with reduced intermediate portion 18 of shaft 12 so that clutch member 24 rotates with and is axially retained on shaft 12. Hub portion 26 is pressed onto shaft portion 18 until it abutts the inner race of bearing 20 to confine bearing 20 in the other direction of axial movement. Clutch member 24 is further retained to shaft 12 by a retaining ring 34 disposed in a circumferential slot 35 within shaft 12. Several circumferentially spaced breathing apertures 36 are formed in clutch member 24 at the point of transition between hub portion 26 and plate portion 28.

A clutch cover assembly 38 comprising a cover member 40 and a body member 42 is mounted for rotation on shaft 12. Body 42 includes a hub 44 which is supported on the lateral surface of the outer race of bearing assembly 20 and is disposed in an interference fit therewith. Two shoulder portions 46 and 47 of hub 44 react against both ends surfaces of the outer race of bearing assembly 20 and limit movement of body 42 in both axial directions.

The end of shaft 12 distal flange 14 terminates in a reduced end portion 48 which functions as an inner race supporting surface for a roller bearing assembly 50. Cover 40 includes a hub 52 and plate portion 54 having a plurality of concentric annular coupling lands 56 on the back side thereof. Likewise, body member 42 has a plate portion 55 having a plurality of concentric annular lands 57 on the front side thereof. Hub 52 is supported on the lateral surface of the outer race of bearing assembly 50 and is disposed in an interference fit therewith. Body 42 and cover 40 are thereby free to rotate about shaft 12 on bearing assemblies 20 and 50. Cover 40 is affixed to body 42 by means of a shoulder portion 43 which circumferentially embraces the radially outward most edge of body 42. Shoulder portion 43 is preferrably formed by swedging or otherwise locally deforming cover 40. A plurality of fan blades 58 are secured at the shank portion thereof by studs, nuts and lockwashers 60 at a radially intermediate portion of body 42. An elastomeric seal 62 resides in an annular channel 64 in the radially outward most portion of body 42 which abuts cover 40.

Cover 40 is provided with an annular recess 66 formed in the face thereof on the side adjacent lands 30. A pair of diametrically opposed axially directed holes 68 are disposed slightly radially outwardly of annular lands 56 within cover 40. Annular lands 56 and 30 as well as lands 31 and 57 and the adjoining grooved portions body 42 and cover 40 constitute shear surfaces and define an operating chamber generally designated 70 on both sides of plate portion 28 of clutch member 24, which operates such as described in U.S. Pat. No. 4,056,178, the specification of which is incorporated herein by reference. Annular lands 30 and 31 terminate or are alternately cut away in the form of a V-notch to form three equally spaced radially directed channels. The structure defines a known fluid path commencing with the area adjacent lands 30 and 56 as well as 31 and 57, the radial channels, axially directed holes 68 and annular recess 66.

Cooling fins 72 are integrally formed in cover 40 adjacent fan blades 58. Cooling fins 72 are arranged to provide additional cooling area and dissipate heat which is generated in clutch 10.

The radially innermost portion of the outside surface of cover 40 coacts with a cover plate 74 and a reservoir divider 75 to define a first or primary fluid storage chamber designated at 76 and a second or secondary fluid storage chamber designated at 77. The material of cover 40 proximate the peripheral edge of cover plate 74 is deformed to retain plate 74. An elastomeric seal 63 resides in an annular channel 65 in the leftward most surface of cover 40 (adjacently radially outwardly of chamber 77) which abuts cover plate 74.

Reservoir divider 75 is generally cylindrical in shape and has a central plate portion 78 integrally interconnecting a radially outward axially directed flange portion 80 and a central hub portion 82. Flange portion 80 extends circumferentially about reservoir divider 75, the radially outwardmost portion thereof set in an interference fit with a complimentarily shaped portion of cover member 40 for rotation therewith.

Two diametrically opposed radially directed return passage apertures 84 interconnect holes 68 with a divider interface cavity 86. Apertures 84 pass through associated areas of increased wall thickness 88 within cover 40. Reservoir divider 75 has two areas of increased wall thickness 90 which define two diametrically opposed radially directed return passage apertures 92 which are substantially in register with apertures 84, opening radially outwardly to cavity 86 and radially inwardly to an axially directed straight wall passageway 94 in hub portion 82 of reservoir divider 75. The radially outwardmost ends of return passage apertures 84 are sealed with interferance fit balls 96 or other suitable material.

Hub portion 82 of reservoir divider 75 extends leftwardly (as viewed in FIG. 2) through a registering aperture 98 in cover plate 74 and is interfaced thereabout by an elastomeric seal 100. A valving element 102 is slidably disposed within passageway 94 and extends leftwardly from the point of emergence of passageway 94 at the lefthand most extent of hub portion 82 of reservoir divider 75. The lefthand most end of valving element 102 is affixed to the center of a bimetal disc 104 which is supported and spaced from the lefthand most surface of cover plate 74 by two or more circumferentially spaced Z-shaped brackets 106 suitably affixed to cover plate 74. Valving element 102 defines an axial bore 108 which is closed at both ends thereof and, depending upon the axial position of element 102 vis-a-vis hub portion 82, communicates with return passage apertures 92 through diametrically opposed radially directed ports 110 and with primary fluid storage chamber 76 through a second set of diametrically opposed radially directed ports 112 which are axially spaced from ports 110.

The right-hand most end of valving element 102 terminates within primary fluid storage chamber 76. An elongated valve blade 114 within primary fluid storage chamber 76 depends radially outwardly from the righthand most end of valving element 102. The radially outward most ends of valve blade 114 are illustrated as overlaying a pair of diametrically opposed relatively large drain ports 116 which would otherwise provide for fluid communication between primary fluid storage chamber 76 and operating chamber 70. A biasing spring 118 bears leftwardly against the righthand most surface of reservoir divider 75 and rightwardly against the left-hand most surface of valve blade 114 adjacent its point of interconnection with valving element 102.

Valving element 102, bimetal 104, valve blade 114 and biasing spring 118 comprise a first valve assembly generally designated at 120 which operates to modulate the flow of viscous fluid within clutch 10 as follows: valving element 102 is keyed to bimetal disc 104 and thus, along with valve blade 114 is prevented from rotational displacement. First valve assembly 120, however, is axially displaceable from a first (illustrated position) to a second position in which valve blade 114, valving element 102 and the central portion of bimetal disc 104 are displaced leftwardly as viewed in FIG. 2.

Bimetallic disc 104 is constructed employing known bimetal technology to assume its illustrated concave (as viewed from the left) configuration when the ambient temperature of the air impinging upon the front face of cover member 40 is below a primary valve actuation temperature ($T_p$). When the temperature of the air impinging on bimetallic disc 104 exceeds $T_p$, the bimetallic disc 104 will, by over center or snap action assume a convex shape as viewed from the left in FIG. 2 and will so remain with increasing temperature. In transitioning from the first postion to the second position, valving element 102 and valve blade 114 are displaced leftwardly. In the first position valve blade 114 overlays drain ports 116 to preclude flow of viscous fluid from the primary fluid storage chamber 76 to operating chamber 70 and, simultaneously, establishes a fluid return passage comprising apertures 84 and 92 to return viscous fluid to primary fluid storage chamber 76 via ports 110, axial bore 108 and ports 112. In the second position, valve blade 114 is displaced leftwardly from its illustrated position, permitting viscous fluid within primary fluid storage chamber 76 to flow through drain ports 116 under the influence of centrifugal forces into operating chamber 70. At the same time, the repositioning of valving element 102 closes off the return passageway where return passage aperture 92 opens into passageway 94 due to axial misalignment of aperture 92 and ports 110. When the temperature of the ambient air impinging upon bimetallic disc 104 falls below $T_p$, the biasing affect of spring 118 will cause valving element 102 and valve blade 114 to snap rightwardly to reassume the illustrated position. Although operation of valve assembly 120 is affected by axial repositioning of valving element 102, it should now be obvious in view of the present specification to one of ordinary skill in the art that analogous rotary valving action could be substituted. Accordingly, the present valving details are given only as by means of illustration and are not considered limiting.

A second bimetallic disc 122 is coaxially disposed within a recess 124 defined by flange 14 and is supported thereby from displacement in one axial direction by a shoulder 126 formed in flange 14. The material forming flange 14 adjacent the circumferential edge of bimetallic disc 122 is swedged or otherwise deformed to prevent displacement of disc 122 in the other axial direction of travel. A ceramic heating element 128 is likewise disposed coaxially within recess 124 adjacent bimetallic disc 122. Heating element 128 operates to heat the surrounding area, including bimetallic disc 122 upon electrical excitation via a pair of insulated electrical leads. One lead 130 passes radially outwardly through a passageway 132 in flange 14, exiting at the circumferential surface of still another reduced intermediate portion 134 of driving shaft 12. A steel race 136 is pressed over portion 134 for support thereon through an intermediate insulating gasket 138. Lead 130 passes through a registering aperture 140 in gasket 138 and is electrically connected to race 136. The remaining lead (not illustrated) is electrically connected to flange 14 and thus ground. Race 136 is thus mechanically supported by driving shaft 12 for rotation therewith but is electrically insulated therefrom. Race 136 and gasket 138 coact to support a bronze slip ring 142 from axial displacement while allowing it to rotate freely thereabout. Slip ring 142 is locally connected to an elongated tether 144 constructed of electrically conductive material. The other end of tether 144 is suitably connected to a control circuit shown generally at 146. In the preferred environment of a motor vehicle, tether 144 is insulatively connected to the vehicle's engine and electrically connected through a coolant temperature sensing switch 148 and a source of voltage potential 150 to ground. Switch 148 is of the type which is mounted on the water jacket of the associated engine and has a heat-sensing probe or element immersed in the liquid coolant flowing therein.

A control pin 152 resides within an axially aligned bore 154 passing through driving shaft 12 and registering apertures 156 and 158 in a pilot bushing 160 and heating element 128, respectively. The righthand most end of control pin 152 is blunted and abuts the central portion of bimetallic disc 122. The lefthand most end of control pin 152 passes through a registering aperture 162 within cover member 40 and terminates within primary fluid storage chamber 76. The lefthand most end of control pin 152 defines an area of reduced diameter 164 which supports a flanged control disc 166 for displacement therewith. Two axially aligned diametrically opposed connecting links 168 depend from the radially outward most extent of control disc 166 and pass leftwardly through relatively lage registering apertures 170 and 172 in valve blade 114 and reservoir divider 75 respectively, terminating within secondary fluid storage chamber 77. A valve blade 174 depends from connecting links 168 and extends radially outwardly within secondary fluid storage chamber 77 to, in the illustrated position, overlay a pair of diametrically opposed interstorage chamber drain ports 176. The center portion of valve blade 174 defines an integral flange 178 which losely surrounds hub portion 82 of reservoir divider 75. A biasing spring 180 is disposed within secondary fluid storage chamber 77 and bears leftwardly against the righthand most surface of coverplate 74 and rightwardly against the lefthand most surface of valve blade 174 at the point where it transitions into flange 178. O-rings 182 are provided in appropriate recesses within valving element 102 and control pin 152. Spill-over ports 184 are provided within reservoir divider 75 to provide selective communication between primary and secondary fluid storage chambers 76 and 77. A breathing aperture 186 passes through hub 52 to provide for air pressure equalization within clutch 10. The point at which breathing aperture 186 opens into primary fluid storage chamber 76 has an area of reduced diameter 188 which is dimensioned small enough to substantially exclude the entrance of viscous fluid while allowing the passage of air therethrough.

Control pin 152, bimetallic disc 122, heating element 128, flanged control disc 166, connecting links 168, valve blade 174 and spring 180 operate as a second valve assembly indicated generally at 190. Valve assembly 190 operates when pin 152 is axially displaced from a first position (illustrated) to a second position wherein control pin 152, flange 166 connecting links 168 and valve blade 174 are displaced leftwardly as viewed in FIG. 2 due to the snap action operation of bimetallic disc 122. Second valve assembly 190 operates to modulate the flow of viscous fluid within secondary fluid storage chamber 77 as it flows to operating chamber 70 via primary fluid storage chamber 76.

Second valve assembly 190 operates as follows: switch 148 is calibrated to close when the liquid coolant within the engine associated with fan drive 10 exceeds a secondary valve control temperature ($T_s$), thereby energizing heater 128. When heater 128 is not energized, bimetallic disc 122 assumes a concave orientation as viewed from the left in FIG. 2. When heater 128 is energized, disc 122 transforms through snap or over center action to assume a convex shape as viewed from the left thereby pushing control pin 152 leftwardly. Although such operation could concievably be employed to actuate first valve assembly 120 as well as second valve assembly 190 by pushing control pin 152 leftwardly against valve blade 114 and valving element 102, in the preferred embodiment of the invention $T_s$ exceeds $T_p$ whereby first valve assembly 120 is in its second position whenever heater 128 is energized. During such a normal operating mode, control pin 152 operates to displace valve blade 174 leftwardly against the biasing effect of spring 180 by virtue of its being directly, rigidly linked thereto. When the temperature of the engine coolant falls below $T_s$, switch 148 will open, allowing bimetallic disc 122 to cool down and reassume its illustrated position whereby biasing spring 180 will return second valve assembly 190 to its illustrated first position. When second valve assembly 190 is in its second position, valve blade 174 is moved away from drain ports 176, allowing fluid communication between secondary storage fluid chamber 77 and operating chamber 70 via primary fluid storage chamber 76.

Figure 3:
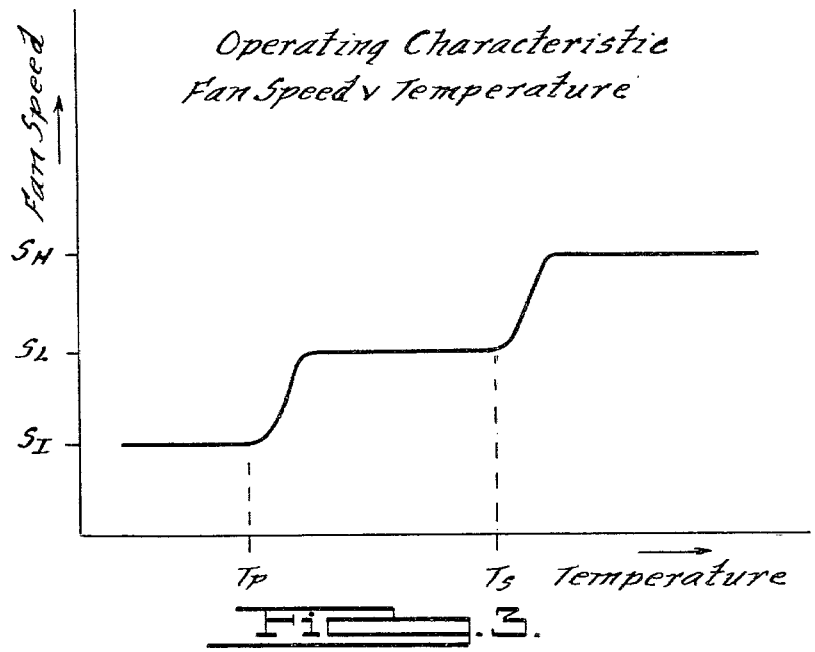
FIG. 3, is a graphical illustration of the fan speed versus temperature operating characteristic of the embodiment of FIG. 1.

Reference to FIG. 3 will best illustrate the overall operation of the present invention. Valve assemblies 120 and 190 provide for dual stage control of viscous fluid clutch 110 whereby clutch 10 engages to drive fan blades 58 at some intermediate speed to reduce power consumption and noise level when the ambient air temperature exceeds $T_p$ and when the engine coolant temperature is less than $T_s$. If the intermediate speed is not sufficient to adequately cool the engine, the engine will heat up whereby its coolant will exceed $T_s$, opening second valve assembly 190 whereby the fan will be increased to full speed for maximum cooling. In such a case, both reservoirs 76 and 77 empty into operating chamber 70 and the fluid return passage is choked due to closing off of return passage aperture 92 by valving element 102. For the purposes of the present invention, recesses 66 and the portion of clutch member 24 that sweeps thereby during relative rotation of cover member 40 and clutch cover assembly 38 is deemed to be a pump 192.

During such relative rotation, pumping action of pump 192 causes viscous fluid to exit the operating chamber 70 through holes 68 and pass radially inwardly through return passage apertures 84, interface cavity 86, return passage apertures 92, ports 110, bore 108, and finally, exiting via ports 112, spilling into primary storate chamber 76. In the instance when both valve assemblies 120 and 190 are in their illustrated or first positions, and during relative rotation between clutch cover assembly 38 and cover member 40, fluid pumped via the return passage will first fill primary fluid storage chamber 76 until the level of the fluid therein is radially coextensive with spill over port 184 at which time additional viscous fluid entering primary fluid storage chamber 76 will spill through into secondary fluid storage chamber 77. It is this feature, i.e. maintaining an exact fill of primary fluid storage chamber 76, regardless of the overall fill volume of the viscous fluid, that provides precise speed control. Restated, a precise, predetermined measure of viscous fluid is returned to primary chamber 76 before any fluid is returned to secondary chamber 77. This insures consistent operation of clutch 10. Once all of the fluid has been pumped out of operating chamber 70, clutch 10 is substantially decoupled whereby the fan will turn only at an incipient speed ($S_i$) due to friction drag between the mutually rotating numbers. When the ambient temperature reaches $T_p$ and first valve assembly 120 is actuated to its second position, the viscous fluid contained in primary fluid storage chamber 76 only is dumped into operating chamber 70 to achieve the intermediate speed ($S_i$) of the fan. The fluid contained in secondary storage chamber 77 is held therein and the fluid which has been dumped into operating chamber 70 is held therein by the choking affect of valving element 102 in the returned passageway.

In operation, pumping action caused by the sweeping of the radially outward most portion of clutch member 24 by annular recess 66 causes a localized region of increased pressure within the operating chamber 70. This pumping action is well known in the art and described in detail in U.S. Pat. No. 3,809,197, the specification of which is incorporated herein by reference. This increased pressure causes the viscous fluid in the operating chamber 70 to pass through holes 68 and into return passage aperture 84. The fluid will then pump radially inwardly through return passage aperture 84 and ultimately into first and second fluid storage chambers 76 and 77 respectively as was described hereinabove.

It is to be understood that the invention has been described with reference to a specific embodiment which provides the features and advantages previously described, and that such specific embodiment is susceptible of modification as will be apparent to those skilled in the art. For example, both valve assemblies could be actuated as a function of sensed ambient air temperature or, both could be actuated as a function of sensed engine coolant temperature. Accordingly, the foregoing is not to be construed in a limiting sense.

What is claimed is:

1. A viscous fluid clutch comprising:
   first and second members mounted for relative rotation about a common axis and defining cooperating shear surfaces;
   means operative to generate a flow of viscous fluid between said surfaces;
   means operative to modulate said flow as a function of a first sensed fluid temperature; and
   means operative to further modulate said flow as a function of a second sensed fluid temperature.

2. The viscous fluid clutch of claim 1, wherein said second sensed fluid temperature exceeds said first sensed fluid temperature.

3. The viscous fluid clutch of cliam 1, wherein said first stated means to modulate flow comprises a valve actuable in response to impingement of ambient air upon said clutch.

4. The viscous fluid clutch of claim 1, wherein said second stated means to modulate flow comprises a valve actuable in response to liquid coolant temperature of an engine associated with said clutch.

5. A viscous fluid clutch comprising:
   a first member secured for rotation with a shaft;
   a second member rotatably disposed on said shaft relative to said first member;
   shear surfaces disposed on said first and second members and forming an operating chamber therebetween;
   first and second fluid storage chambers adjacent said operating chamber;
   means operative to generate a circulating flow of viscous fluid between said chambers;
   first valve means operative to modulate flow of viscous fluid between said first storage chamber and said operating chamber as a function of a first sensed fluid temperature; and
   second valve means operative to modulate flow of viscous fluid between said second storage chamber and said operating chamber as a function of a second sensed fluid temperature.

6. The viscous fluid clutch of claim 5, wherein said first valve means further operates to modulate said flow of viscous fluid between said second storage chamber and said operating chamber.

7. The viscous fluid clutch of claim 5, wherein said first and second fluid storage chambers are serially interconnected with said operating chamber.

8. The viscous fluid clutch of claim 5 wherein said second sensed fluid temperature exceeds said first sensed fluid temperature.

9. The viscous fluid clutch of claim 5, wherein said first stated means to modulate flow comprises a valve actuable in response to impingement of ambient air upon said clutch.

10. The viscous fluid clutch of claim 9, wherein said first stated means comprises a bimetallic element operably engaging a valve disposed substantially coaxially with said shaft.

11. The viscous fluid clutch of claim 5, wherein said second stated means to modulate flow comprises a valve actuable in response to liquid coolant temperature of an engine associated with said clutch.

12. The viscous fluid clutch of claim 11, wherein said second stated means comprises a heating element, a control circuit operative to energize said heating element in response to said coolant temperature exceeding a predetermined value, a secondary control pin and a bimetallic element operative to displace said control pin in response to receiving heat from said heating element.

13. A viscous fluid clutch comprising:
   a first member secured for rotation with a shaft;
   a second member rotatably disposed on said shaft relative to said first member;
   shear surfaces disposed on said first and second members and forming an operating chamber therebetween;
   first and second fluid storage chambers serially adjacent said operating chamber;
   pump means operative to circulate viscous fluid between said operating chamber and said storage chambers via a return passageway;
   first valve means operative to modulate the flow of viscous fluid within said return passageway and the flow of viscous fluid between said first storage chamber and said operating chamber as a function of a first sensed fluid temperature; and
   second valve means operative to modulate the flow of viscous fluid from said second storage chamber to said first storage chamber as a function of a second sensed fluid temperature.

14. A viscous fluid clutch comprising:
   a first member secured for rotation with a shaft;
   a second member rotatably disposed on said shaft relative to said first member;
   shear surfaces disposed on said first and second members and forming an operating chamber therebetween;

first and second fluid storage chambers radially inwardly serially adjacent said operating chamber;

pump means operative to circulate viscous fluid from said operating chamber to a substantially radially inwardly directed return passageway during relative rotation between said members;

first valve means operative to modulate the flow of viscous fluid within said return passageway for selective discharge into said storage chambers and the flow of viscous fluid between said first storage chamber and said operating chamber through at least one interconnecting drain port at the radially outwardmost extent of said first storage chamber, as a function of a first sensed fluid temperature; and second valve means operative to modulate the flow of viscous fluid from said second storage chamber to said first storage chamber through at least one interconnecting drain port at the radially outwardmost extent thereof as a function of a second sensed fluid temperature.

15. The viscous fluid clutch of claims 5, 13 or 14 wherein said means operative to circulate said viscous fluid further operates to fill said first fluid storage chamber with a predetermined measure of viscous fluid prior to circulating viscous fluid to said second fluid storage chamber.

* * * * *